June 8, 1965 M. L. VOUT ETAL 3,187,413
PROCESS OF MANUFACTURING SERVO MOTOR ROTORS
Filed March 2, 1961
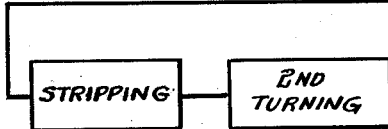
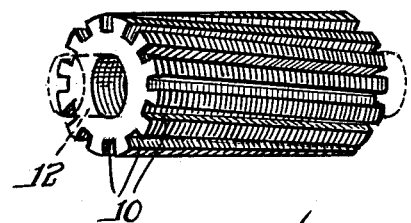
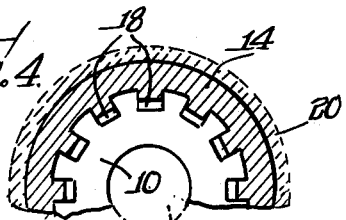
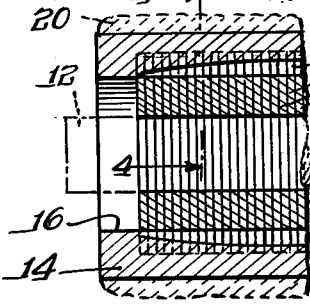
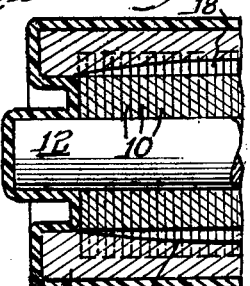
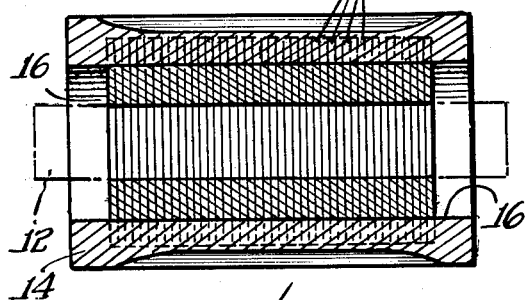
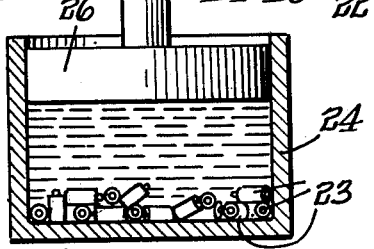
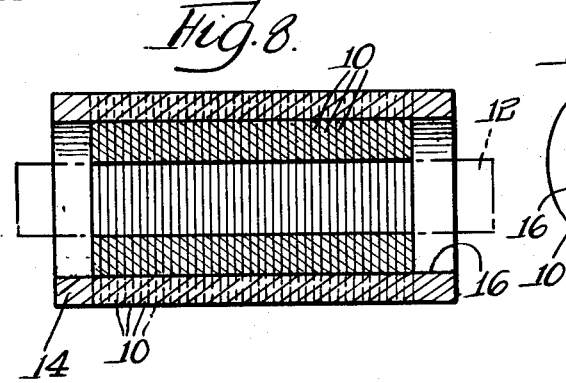
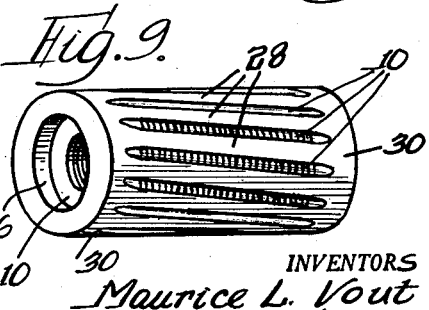
INVENTORS
Maurice L. Vout
Robert E. Skopec
Walter G. Lieberman
By: Olson & Trexler attys.

United States Patent Office 3,187,413
Patented June 8, 1965

3,187,413
PROCESS OF MANUFACTURING SERVO
MOTOR ROTORS
Maurice L. Vout, Robert E. Skopec, and Walter G. Lieberman, Chicago, Ill., assignors to G-M Laboratories Inc., Chicago, Ill., a corporation of Illinois
Filed Mar. 2, 1961, Ser. No. 92,913
6 Claims. (Cl. 29—155.53)

This invention relates generally to electric motors and especially to methods of producing rotors for small electric motors.

According to one conventional procedure, the rotors for servo and other small electric motors are produced by casting an electrically conductive metal about stacked rotor laminae, locking the laminae together and forming conductive end rings and interconnecting bars. However, air is commonly trapped between the edges of the laminae and the inner surface of the interconnecting bars during the casting operation. This trapped air is most commonly found at the central portion of the rotor unit; and the amount of air which is trapped varies considerably from unit to unit giving rise to corresponding variations in the electrical properties of the units. The testing which is necessary to determine the electrical character of each individual rotor unit as well as the subsequent matching of the rotor and a stator unit has proved to be time consuming and expensive.

Accordingly, an important object of the present invention is to provide a method of manufacturing electric motor rotors in a rapid and economical manner.

A more general object of the invention is to provide an improved method of manufacturing electric motor rotors.

Another object of the invention is to provide a process for manufacturing servo motor rotors of uniform electrical properties.

Additional objects and features of the invention pertain to the particular materials and methods whereby the above objects are attained.

A process in accordance with the invention includes the steps of: stacking a number of rotor laminae, casting an electrically conductive metal about the stacked laminae of the rotor unit to form electrically conductive end rings and interconnecting bars, coating the unit with a flexible, resinous plastic material to form a sealed capsule, exerting a fluid pressure on the capsule to urge the cast metal into uniform and intimate contact with the laminae, and removing the coating.

The invention will be better understood by reference to the following disclosure and drawing forming part thereof, wherein:

FIG. 1 is a schematic block diagram of the sequence of steps employed in the process of the invention;

FIG. 2 is an enlarged scale, perspective view of a number of rotor laminae stacked together in preparation for casting of the end rings and interconnecting bars, a dummy shaft for supporting the laminae being shown in phantom outline;

FIG. 3 is a further enlarged view of the stacked laminae after the casting operation, showing the excess metal machined off;

FIG. 4 is a view taken through the section 4—4 of FIG. 3;

FIG. 5 is a view similar to the showing of FIG. 3 and illustrating the flexible coating applied over the unit;

FIG. 6 is a schematic showing of fluid pressure being applied to a number of coated rotor units;

FIG. 7 is a view similar to the showing of FIG. 3 but illustrating the rotor unit after pressure has been applied to it and after the coating has been stripped from its surface;

FIG. 8 is a view similar to the showing of FIG. 7, but illustrating the rotor unit after the final machining operation; and FIG. 9 is a perspective view of a finished rotor unit with the dummy shaft removed.

Referring now in detail to the drawing, specifically to FIG. 2, a number of rotor laminae 10 will be seen stacked together on a dummy shaft 12 in accordance with the first step of the invention. In compliance with customary practice, each of the laminae 10 comprises an annular disc with uniformly arcuately spaced slots extending radially inwardly from the periphery. The laminae are made of magnetic steel and are stacked with the slots of the individual laminae progressively radially offset as is shown in the drawing. This progressively offset arrangement of the laminae defines aggregate slots in the stack that are twisted or spiraled. Better electrical properties of the rotor result.

After the laminae 10 have been stacked, a conductive metal such as aluminum is cast about the laminae, embedding the laminae in generally tubular body of metal 14. Die casing or centrifugal casting operations are suitable in this regard; and when the body of metal 14 is cast about the laminae 10, a counterbore 16 is formed at each end of the unit. Undesirable air spaces 18 are also formed during casting. These air spaces 18 occur in the slots of the laminae beneath the undersurface of the cast metal and above the edges of the laminae as is shown in FIG. 4. The air spaces or voids 18 have been found to be of generally greater dimension at the central portion of the unit than near the ends thereof. This shape of the air spaces 18 is shown in FIG. 3.

After the casting step, any excess metal such as the excess metal 20 illustrated in FIG. 3, is removed. Machining operations employing a lathe or a grinder may be used in this regard; and at this stage in the process, the rotor unit will take an intermediate, generally tubular shape, the body of cast metal 14 completely covering the distal edges of the laminae.

Next, a flexible coating 22 is applied over the surface of each of the rotor units as is shown in FIG. 5; and this flexible coating 22 is advantageously selected to be a resinous plastic material, cellulose acetate-butyrate having proved eminently useful in this regard. The coating 22 is applied by dip coating, but spraying of a hot melt may also be employed. The coating 22 completely and intimately covers the exposed surfaces of the body of metal 14, the exposed portions of the dummy shaft 12 and the exposed portions of the faces of the end laminae. The coating, however, does not penetrate between the dummy shaft and the laminae nor between the laminae themselves. Furthermore, the coating 22 is arranged to be flexible in order to transmit pressure, but it also seals the unit hermetically in order to exclude fluid, as will now be described.

With reference to FIG. 6, a number of the rotor units 23 which have been previously coated are dropped into a hydraulic cylinder 24 which is filled with a suitable fluid such as hydraulic oil. Thereafter, a piston 26 is urged into the cylinder 24 to exert a fluid pressure on the coated rotor units. When a pressure on the order of 10,000 p.s.i. is applied, the cast metal in the vicinity of the air spaces 18 is urged radially inwardly into uniform and initimate contact with the edges of the laminae. While it has not been positively determined, it is believed that the air in the air spaces 18 is forced into interstices between the laminae. It is also believed that this application of pressure to the cast metal makes the metal more homogeneous by collapsing random voids formed in the metal during casting.

When the piston 26 is retracted releasing the pressure, the coated rotor units are extracted from the cylinder 24 and are cleaned of any oil clinging to the surface of the coating. Thereafter, the coating is removed; and it may be physically or chemically stripped from the rotor unit as is desired. The resultant assembly is shown in FIG. 7.

After the coating has been removed, the rotor unit is once more machined, trimming off surface metal and restoring the unit to a cylindrical shape as is shown in FIG. 8. The tips of the laminae will be seen exposed at the outer surface of the unit dividing the body of metal 14 into conductive bars 28 extending generally axially along the surface of the unit as is shown in FIG. 9. The bars 28 join together at the ends of the unit to form end rings 30. It will be recognized that the interconnecting, conductive bars 28 comprise the metal which has been formed into the slots of the stacked laminae.

Completion of the unit is achieved by removing the dummy shaft 12 as is also shown in FIG. 9.

The foregoing process has been found to produce rotors possessed of highly uniform electrical properties. Moreover, the method is both rapid and economical. Accordingly, the specific example herein shown and described should be considered illustrative only. Various changes may occur to those skilled in the art; and these changes are to be understood as forming a part of this invention insofar as they fall within the true spirit and scope of the appended claims.

The invention is claimed as follows:

1. The process of manufacturing electric motor rotors which comprises providing a rotor of relatively hard metal having a plurality of slots therein respectively extending substantially from end to end thereof, placing relatively soft rotor bar conductive metal in said slots, coating said rotor and bar metal with a flexible material to form a sealed capsule, exerting a fluid pressure on said capsule to urge said conductive bar metal into uniform and intimate contact with said rotor, subsequently removing said coating, and thereafter machining the rotor and bar metal to the extent necessary to separate the conductive bar metal into rotor windings.

2. The process of manufacturing electric motor rotors as set forth in claim 1 wherein the conductive bar metal is placed in the rotor slots initially extending radially out beyond the diameter of the outer surface of the rotor.

3. The process of manufacturing electric motor rotors which comprises providing a rotor of relatively hard metal having a plurality of slots therein respectively extending substantially from end to end of said rotor, casting relatively soft rotor bar conductive metal in said slots, coating said rotor and conductive metal with a flexible material to form a sealed capsule, exerting a fluid pressure on said capsule to urge said conductive metal into uniform and intimate contact with said rotor, removing said coating, and thereafter machining said rotor and bar metal to the extent necessary to separate the conductive bar metal into rotor windings.

4. The process of manufacturing electric motor rotors which comprises stacking a plurality of relatively hard metal rotor laminations according to a predetermined arrangement to provide a rotor having slots therein respectively extending from end to end thereof, casting a relatively soft rotor bar metal in and about said slots and beyond the ends of said rotor to form conductive end rings and interconnecting bars, coating said rotor and cast metal with a flexible material to form a sealed capsule, exerting a fluid pressure on said capsule to urge said cast metal into uniform and intimate contact with said rotor laminations, removing said coating, and thereafter machining the rotor and bar metal to the extent necessary to separate the conductive bar metal into rotor windings.

5. The process of manufacturing electric motor rotors as set forth in claim 4 which includes the step between casting and coating of machining away a predetermined amount of said cast metal.

6. The process of manufacturing electric motor rotors which comprises providing a rotor of relatively hard metal having a plurality of slots therein respectively extending substantially from end to end thereof, casting relatively soft rotor bar metal in said slots and extending outwardly of said slots, exerting a fluid pressure on said rotor and said cast metal to force said cast metal into uniform and intimate contact with said rotor, and thereafter machining the rotor and bar metal to the extent necessary to separate the conductive bar metal into rotor windings.

References Cited by the Examiner
UNITED STATES PATENTS

| | | | |
|---|---|---|---|
| 2,196,002 | 4/40 | Whitney et al. | 29—528 |
| 2,648,125 | 8/53 | McKenna et al. | 29—421 |
| 2,761,204 | 9/56 | Bannister | 29—528 |
| 2,807,844 | 10/57 | Hemphill | 22—58 |
| 2,936,520 | 5/60 | De Sternberg | 29—421 |
| 2,953,826 | 9/60 | Larsh | 22—203 |
| 2,991,518 | 7/61 | Schaefer | 29—203 |

JOHN F. CAMPBELL, *Primary Examiner.*

WHITMORE A. WILTZ, *Examiner.*